Patented Oct. 19, 1948

2,451,865

UNITED STATES PATENT OFFICE 2,451,865

ADHESIVE MATERIAL

William J. O'Brien, West Haven, Conn., assignor to The Seamless Rubber Company, New Haven, Conn., a corporation of Connecticut No Drawing. Application May 7, 1945,
Serial No. 592,529

6 Claims. (Cl. 260—23)

This invention relates to adhesive material, and more especially to an adhesive material used on a fabric backing in order to provide an adhesive web in the form of a tape or sheet, to be used as surgical plaster and, in some cases, as a so-called industrial tape.

This application is a continuation in part of my application Serial No. 510,240, filed November 13, 1943, now abandoned.

In the production of webs of the class here under discussion, an important ingredient of the adhesive coating or mass has, in the past, been natural rubber. One of the objects of the present invention is to provide a superior adhesive material primarily for use on cloth, utilizing one or more rubbery substances other than natural rubber.

Another object is to give new or added valuable characteristics to adhesive material for use on cloth or fabric in providing surgical plasters and industrial tapes.

In a composition of this kind it is not only necessary that the adhesive when first made have the necessary strong adhesive quality, but that the material should age well, and it is highly important that the composition process well in the mill room, where, in a calendering process, the coating is applied in a uniform layer to one side of the plaster cloth or other fabric backing. Again it is necessary that the adhesive adhere strongly to the fabric backing, as well as to the surface to which the adhesive is to be applied in use of the finished article. In the manufacture of surgical plaster, moreover, it is necessary that the adhesive be of a kind suitable for spreading on the backing in a relatively heavy layer. The adhesive material should not be of a character such that, having excessive cold flow, it works its way into and through the carrying fabric so as to be displaced from that face of the fabric intended to carry the adhesive, and, furthermore, the adhesive should not be so susceptible to elevated temperatures that, when subjected thereto, it softens unduly.

In forming the new adhesive I use as a filler and reinforcement zinc oxide. For the purposes here in view zinc oxide is the most satisfactory filler. As a rubbery ingredient for the composition, to impart a rubbery quality to the adhesive, I may use polyisobutylene of high molecular weight, the range of weight being between 80,000 and 120,000. I have found that this substance overcomes a difficulty with the long stringy fibrous "legs" (which are produced when two surfaces of the adhesive mass are stuck together and pulled apart), which are objectionable in an adhesive mass used for some purposes. A satisfactory polyisobutylene is sold under the trade designation "Vistanex polybutene." This substance is a substantially permanently tacky adhesive of high viscosity, substantially non-oxidizable at ordinary temperatures, and besides being rubbery, resilient and flexible it is transparent and colorless, or substantially colorless, thereby adapting itself to use in a white or substantially colorless mass such as manifestly desirable for surgical purposes in comparison to a dark mass.

Another rubbery substance which may be used in the composition is a rubber known in the trade as "butyl" rubber. This is a rubbery copolymer of isobutylene and a diolefine in approximately the proportions of 98:2, i. e., approximately 98 parts of isobutylene and approximately 2 parts of a diolefine. I may use, for example, normal "butyl" of the grade designated GR—I, having an 8-minute Mooney of 40—50. Another suitable "butyl" rubber is a normal "butyl" of the grade designated GR—I Y15, having an 8-minute Mooney of 40—50.

In the new adhesive I make use of a factice of highly refined cured vegetable oil. I prefer a factice of highly refined rapeseed oil cured by the use of hydrogen sulphide gas. A factice of this latter kind is a white fluffy elastic solid of a consistency similar to that of fresh white bread, the color being a creamy white. Factice material of this kind which can be used very successfully is marketed under the trade designation "Amberex B." Another factice which may be used is made of highly refined linseed oil, cured with sulphur.

It is preferred to use as a resinous component the glyceryl ester of hydrogenated rosin. This is a hard and rather brittle solid substance of a pale yellow color. It acts as a plasticizer and as a retarder of hardening of the mass, and it also acts as a tackifier so as to increase the tackiness of the resulting adhesive mass. The glyceryl ester of hydrogenated rosin which I prefer to use is known in the trade as "Staybelite Ester Gum #10."

Another resinous substance which may be used is dehydroabietic acid. This substance can be obtained under the designation "Galex W—100." Other resinous substances which may be used are rosin, hydrogenated rosin, and wood rosin. The glyceryl ester of hydrogenated rosin is, however, preferred.

Another ingredient of the composition may be polyisobutylene of low molecular weight, the weight range being between 10,000 and 20,000. A suitable material for this purpose is designated "Vistac polybutene." This is a tack-producing substance which is of special value for the purpose of obtaining strong adhesion of the adhesive mass to the fabric backing. The substance is of particular value in causing the adhesion of the rubbery mass to a plaster cloth or similar material.

The ingredients used, and their proportions, are given in several following examples of composition coming within the scope of the invention.

Example 1

In the preparation of surgical plaster the following composition can be used:

|  | Lbs. | Oz. |
|---|---|---|
| Polyisobutylene of 100,000 molecular weight | 10 | -- |
| Factice of highly refined rapeseed oil cured with hydrogen sulphide gas | 7 | -- |
| Zinc oxide | 15 | -- |
| Glyceryl ester of hydrogenated rosin | 15 | -- |
| Beeswax | -- | 8 |
| White mineral oil | 6 | -- |
| Petrolatum | 3 | -- |
| Polyisobutylene of 10,000 molecular weight | 1 | 12 |
|  | 58 | 4 |

The plaster cloth to which this composition is to be applied is, for example, a white bleached sheeting of cotton, 80 x 80 count, and of four-yard weight, i. e., four yards to the pound.

In preparing the mixture of the ingredients the high molecular weight polyisobutylene and the factice may be blended together, then the petrolatum and one half of the mineral oil mixed in. Then are added the zinc oxide, beeswax, the balance of the mineral oil, and the low molecular weight polyisobutylene, and finally the glyceryl ester of hydrogenated rosin. These ingredients are mixed in a suitable manner, usually by the use of an open heated mixing mill.

The mixture is entirely suitable for spreading in heavy layers on fabric of the general type above mentioned, in a calendering process common in the art of manufacturing surgical plaster, where a three-roll calender is customarily employed for applying the tacky coating to the textile layer, the adhesive coating material being thrown in between the top roll and the middle roll, and passing over the middle roll in a measured layer to be applied by that roll to the cloth layer fed between that roll and the lowermost roll. Where the typical surgical plaster backing is used, the adhesive mixture above mentioned, in contradistinction to various other mixtures which have been proposed, will not work its way into the fabric as a result of excessive cold flow, and, on the other hand, it will not be unduly softened when the temperature is raised substantially above a normal room temperature.

This adhesive is well suited to application to the fabric by the calendering process referred to above, and has a long life and possesses high internal strength, as well as strong adhesion to the fabric and to the surface on which the plaster or the like is to be used, and is admirably suited in these and other respects to use in surgical plasters. The factice referred to above is thoroughly compatible with the polyisobutylenes, and with the glyceryl ester of hydrogenated rosin, and also with the white mineral oil which is used as a plasticizer.

In another composition for use in surgical plaster, the same ingredients may be used as in Example 1, but in different proportions. In this second example certain ingredients are referred to by their trade names for purposes of brevity.

Example 2

|  | Lbs. | Oz. |
|---|---|---|
| Polyisobutylene of 100,000 molecular weight | 10 | -- |
| Factice of highly refined rapeseed oil cured with hydrogen sulphide gas | 32 | 8 |
| Zinc oxide | 40 | -- |
| Glyceryl ester of hydrogenated rosin | 40 | -- |
| Beeswax | -- | 12 |
| White mineral oil | 7 | 8 |
| Petrolatum | 5 | -- |
| Polyisobutylene of 10,000 molecular weight | 20 | -- |
|  | 155 | 12 |

In this composition, the adhesive mass is characterized by more dryness and less softness than in the case of Example 1, and the mass is also characterized by short "legs." An adhesive mass of this kind is particularly intended for use with a fabric of relatively open weave, say, a bleached cotton cloth of 60 x 60 count, of a weight of three ounces per square yard. Such a fabric is, of course, of a less expensive type than that mentioned with connection with Example 1. The mass produced by the combination of ingredients in Example 2 possesses very little cold flow, and hence will not penetrate the relatively thin open-weave fabric which is used in this instance. It is noted that in this example the quantity of factice in relation to the quantity of polyisobutylene of high molecular weight is markedly increased in comparison to Example 1.

Example 3

|  | Lbs. | Oz. |
|---|---|---|
| Polyisobutylene of 100,000 molecular weight | 40 | -- |
| Factice of highly refined rapeseed oil | 10 | -- |
| Zinc oxide | 45 | -- |
| Dehydroabietic acid (Galex W—100) | 50 | -- |
| Beeswax | -- | 8 |
| White mineral oil | 7 | -- |
| Lanolin | 5 | -- |
| Polyisobutylene of 10,000 molecular weight | 4 | -- |
|  | 161 | 8 |

In this example the adhesive mass is quite soft in comparison with those of Examples 1 and 2, and is characterized by longer "legs." This mass is ideal for finely woven hard fabrics of a thread count of 80 x 80 and weighing, say, four ounces per square yard. This mass provides a tape or web which can be used for surgical plaster, and as the mass possesses considerable cold flow (particularly in comparison to Example 2), an excellent sealing tape is provided which can be used for industrial purposes as well as surgical purposes.

In the next following example there is provided an adhesive mass in which substitutes for some of the above-mentioned ingredients are used.

Example 4

| | Lbs. | Oz. |
|---|---|---|
| Polyisobutylene of 100,000 molecular weight | 40 | -- |
| Factice of highly refined vulcanized linseed oil | 10 | -- |
| Zinc oxide | 45 | -- |
| Glyceryl ester of hydrogenated rosin | 52 | -- |
| Beeswax | -- | 8 |
| White mineral oil | 5 | -- |
| Petrolatum | 5 | -- |
| Rosin oil | 4 | -- |
| | 161 | 8 |

Here a factice of highly refined vulcanized linseed oil is used in place of the factice of rapeseed oil, and rosin oil is used in place of the polyisobutylene of low molecular weight, for increasing the adhesive connection of the mass to the fabric web.

Another composition is as follows:

Example 5

| | Lbs. |
|---|---|
| Polyisobutylene of 100,000 molecular weight | 20 |
| Rubbery copolymer of isobuylene and a diolefine in approximately the proportions of 98:2 | 20 |
| Factice of highly refined rapeseed oil | 60 |
| Zinc oxide | 70 |
| Glyceryl ester of hydrogenated rosin | 52 |
| White mineral oil | 11 |
| Polyisobutylene of 10,000 molecular weight | 19 |
| | 252 |

It will be noted that in this example both the polyisobutylene of high molecular weight and "butyl" rubber are used, these ingredients being used in equal amounts in this particular instance.

Other examples follow:

Example 6

| | Lbs. |
|---|---|
| Polyisobutylene of 100,000 molecular weight | 5 |
| Rubbery copolymer of isobutylene and a diolefine in approximately the proportions of 98:2 | 35 |
| Factice of highly refined rapeseed oil | 60 |
| Zinc oxide | 70 |
| Glyceryl ester of hydrogenated rosin | 52 |
| White mineral oil | 11 |
| Polyisobutylene of 10,000 molecular weight | 19 |
| | 252 |

Example 7

| | Lbs. |
|---|---|
| Rubbery copolymer of isobutylene and a diolefine in approximately the proportions of 98:2 | 40 |
| Factice of highly refined rapeseed oil | 60 |
| Zinc oxide | 70 |
| Glyceryl ester of hydrogenated rosin | 45 |
| White mineral oil | 12 |
| Polyisobutylene of 10,000 molecular weight | 21 |
| | 248 |

Example 8

| | Lbs. |
|---|---|
| Rubbery copolymer of isobutylene and a diolefine in approximately the proportions of 98:2 | 21 |
| Factice of highly refined rapeseed oil | 32 |
| Zinc oxide | 35 |
| Glyceryl ester of hydrogenated rosin | 52 |
| White mineral oil | 8 |
| Polyisobutylene of 10,000 molecular weight | 18 |
| | 166 |

Example 9

| | Lbs. |
|---|---|
| Rubbery copolymer of isobutylene and a diolefine in approximately the proportions of 98:2 | 21 |
| Factice of highly refined rapeseed oil | 32 |
| Zinc oxide | 35 |
| Hydrogenated rosin | 52 |
| White mineral oil | 3 |
| Polyisobutylene of 10,000 molecular weight | 18 |
| Petrolatum | 5 |
| | 166 |

Analysis of the examples given shows that the percentage of the glyceryl ester of hydrogenated rosin or other resinous component, by weight, ranges from 18.15%, in the case of Example 7, to 32.2%, in the case of Example 4, and in all cases is in excess of 18%

An important advantage of my new compositions arises from the fact that the factice of highly refined vegetable oil is exceptionally compatible with the polyisobutylenes or the butyl rubber, or a combination of the two, and is also exceptionally compatible with the resinous component, especially the glyceryl ester of hydrogenated rosin, and will not bloom to the surface. Neither will this factice prejudicially affect the tack of the tape adhesively or cohesively. The adhesive of the invention is an homogeneous solid solution, and this can be demonstrated by applying the adhesive tape to a clean glass plate. The tape can be lightly touched to a window pane, for example, and will adhere thereto strongly, so as to maintain the weight of the depending roll of tape. When pulled off from the glass the tape leaves the glass clean and free from any oily residue. Surgical plaster is expected to withstand steam sterilization at 250° F. for thirty minutes before it is wrapped and sent out of the factory, and where my adhesive is used in the plaster this sterilization presents no obstacles for there is no reduction in viscosity, nor do oily residues bloom to the surface, nor is there any deterioration in adhesive or cohesive tack as a result of sterilization. Because of this the adhesive is admirably adapted for the manufacture of sterilizable finger bandages, known in the trade as adhesive compresses, or stick bands.

Another virtue of the new adhesive is its pure white color and its freedom from objectionable odor. It will also tolerate the addition of small amounts of an antiseptic material, such as thymol or G—4. G—4 is an antiseptic and deodorant supplied by Givaudan Delawanna, Inc., of New York city, the same being essentially 2,2' dehydroxy 5,5' dichloro diphenyl methane. Also the composition is free from skin irritants, so that, with or without an antiseptic ingredient, it has no tendency to produce dermatitis. The composition is also suitable for the incorporation of medicaments, for example, belladonna or atropine. It has been previously stated that the composition is well adapted for application to its fabric backing in relatively heavy coatings, and it can be used very satisfactorily in the manufacture of medicated plaster of the back, loin and kidney types, where the coating often runs as high as 8 to 10 ounces per square yard.

In the use of natural rubber for the manufacture of adhesive tape or sheeting of the class under discussion, a prime advantage of the rubber component was its absorptive quality, which facilitated absorption and uniform diffusion of the various ingredients of the adhesive mass. In the discovery of a satisfactory adhesive mass, omitting natural rubber, among other things much difficulty was encountered because of the lack of the desired absorptive quality in the rubber-like material. This difficulty has been overcome by the use of compositions of the character of those given in the examples.

In the new composition the resinous component, as will be seen, comprises material from the group consisting of hydrogenated rosin, glyceryl ester of hydrogenated rosin, dehydroabietic acid, and wood rosin. The factice consists essentially of a highly refined cured vegetable oil of the group consisting of rapeseed oil and linseed oil, without additions which would be incompatible with the rubbery material and the other ingredients. Additional ingredients of the composition, such as Vistac, mineral oil, petrolatum, and beeswax, are used in minor but effective amount for modifying the plasticity and tackiness of the mass. The glyceryl ester of hydrogenated rosin is of special value as a retarder of hardening of the zinc oxide. The rubbery material, it will be understood, is used in the uncured or unvulcanized state.

What I claim is:

1. A composition used as an adhesive and containing four principal components, of which the first is zinc oxide, the second a resinous material, the third a rubbery component, and the fourth a factice, the resinous component being in excess of 18% by weight so as to render the mass tacky; comprising a material from the group consisting of hydrogenated rosin, glyceryl ester of hydrogenated rosin, dehydroabietic acid and wood rosin, the rubbery component being material of the group consisting of polyisobutylene of molecular weight between 80,000 and 120,000 and a rubbery copolymer of isobutylene and a diolefine in approximately the proportions of 98:2, and mixtures thereof, the factice being light in color and consisting of a highly refined cured vegetable oil of the group consisting of rapeseed oil and linseed oil.

2. A composition used as an adhesive and containing zinc oxide, glyceryl ester of hydrogenated rosin, a rubbery substance from the group consisting of polyisobutylene of molecular weight between 80,000 and 120,000 and a rubbery copolymer of isobutylene and a diolefine in approximately the proportions of 98:2, and mixtures thereof, and a light-colored fluffy factice consisting of hydrogen-sulphide-cured rapeseed oil, the glyceryl ester of hydrogenated rosin being in excess of 18% by weight so as to render the mass tacky.

3. A composition used as an adhesive and containing zinc oxide, glyceryl ester of hydrogenated rosin, polyisobutylene of molecular weight between 80,000 and 120,000, a rubbery copolymer of isobutylene and a diolefine in substantially the proportions of 98:2, and a light-colored fluffy factice consisting of hydrogen-sulphide-cured rapeseed oil, the glyceryl ester of hydrogenated rosin being in excess of 18% by weight so as to render the mass tacky.

4. A composition used as an adhesive and containing the following ingredients:

| | Lbs. | Oz. |
|---|---|---|
| Polyisobutylene of 100,000 molecular weight | 10 | -- |
| Factice of highly refined rapeseed oil cured with hydrogen sulphide gas | 7 | -- |
| Zinc oxide | 15 | -- |
| Glyceryl ester of hydrogenated rosin | 15 | -- |
| Beeswax | -- | 8 |
| White mineral oil | 6 | -- |
| Petrolatum | 3 | -- |
| Polyisobutylene of 10,000 molecular weight | 1 | 12 |
| | 58 | 4 |

5. A composition used as an adhesive and containing the following ingredients:

| | Lbs. | Oz. |
|---|---|---|
| Polyisobutylene of 100,000 molecular weight | 10 | -- |
| Factice of highly refined rapeseed oil cured with hydrogen sulphide gas | 32 | 8 |
| Zinc oxide | 40 | -- |
| Glyceryl ester of hydrogenated rosin | 40 | -- |
| Beeswax | -- | 12 |
| White mineral oil | 7 | 8 |
| Petrolatum | 5 | -- |
| Polyisobutylene of 10,000 molecular weight | 20 | -- |
| | 155 | 12 |

6. A composition used as an adhesive and containing the following ingredients:

| | Lbs. |
|---|---|
| Polyisobutylene of 100,000 molecular weight | 20 |
| Rubbery copolymer of isobutylene and a diolefine in approximately the proportions of 98:2 | 20 |
| Factice of highly refined rapeseed oil | 60 |
| Zinc oxide | 70 |
| Glyceryl ester of hydrogenated rosin | 52 |
| White mineral oil | 11 |
| Polyisobutylene of 10,000 molecular weight | 19 |
| | 252 |

WILLIAM J. O'BRIEN.

REFERENCES CITED

The following references are of record in the file of this patent:

UNITED STATES PATENTS

| Number | Name | Date |
|---|---|---|
| 2,235,536 | Savage | Mar. 18, 1941 |